3,075,979
PREPARATION OF TRIALKYL ISOCYANURATES
James J. Tazuma, Stow, Ohio, and Richard Miller, Old Bridge, N.J., assignors to FMC Corporation, a corporation of Delaware
No Drawing. Filed Oct. 15, 1958, Ser. No. 767,298
3 Claims. (Cl. 260—248)

This invention relates to a novel process for the preparation of trialkyl isocyanurates, by the direct alkylation of cyanuric acid.

Trialkyl isocyanurates have previously been prepared in a variety of ways, which have been generally characterized by reaction of a metal salt of cyanuric acid with an alkylating agent, most commonly an alkyl sulfate or halide. Other methods of preparation of trialkyl isocyanurates have included the trimerization of a variety of cyanates and isocyanates. All of these methods have been accompanied by various disadvantages, such as requiring the use of expensive starting materials or of superatmospheric pressure, having a long reaction time, or poor yields of product.

It has now been discovered that cyanuric acid may be reacted directly with alkylating agents, by carrying out the alkylation in the presence of a basic acceptor for the acid formed in the reaction, and preferably in the presence of a high boiling solvent for the product. The desired trialkyl isocyanurate is obtained in high yields. The preparation of the intermediate metal salt of cyanuric acid, heretofore believed necessary for alkylation, is eliminated. The reaction is relatively rapid, and can be conducted at atmospheric pressure. The reactants and solvent are inexpensive, and the process is simple to carry out.

The chemical reaction involved is the combination of three equivalents of alkylating agent with each mole of cyanuric acid, and the reaction of each mole of hydrogen acid formed with a base, as illustrated in the following equation:

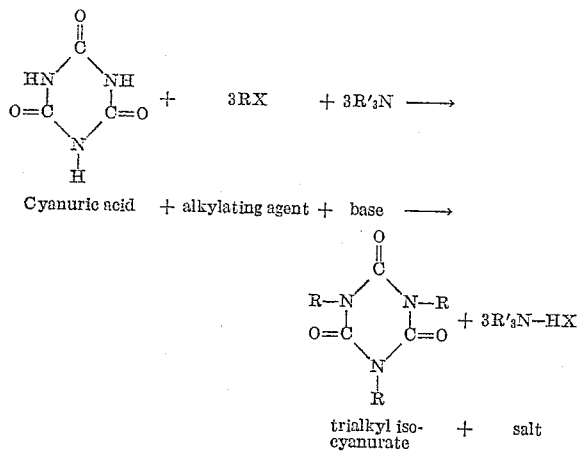

For complete conversion of the cyanuric acid, at least stoichiometric proportions of the reactants should be employed. If less than three equivalents of alkylating agent are used the yield of trialkyl isocyanurate is lowered, and unreacted cyanuric acid is recovered and may be recycled. An excess of alkylating agent may be used, as a solvent for the reaction mixture, or to be recycled if the process is carried out continuously. It has been found that the product of the reaction when less than three equivalents of alkylating agent are used is the trialkyl isocyanurate plus unreacted cyanuric acid, rather than mixtures of partially alkylated products, so that the desired trialkyl isocyanurate is obtained even when less than stoichiometric proportions are used.

The basic acceptor for the acid produced should be present in sufficient amount to react with all of the acid formed during the alkylation reaction. Thus, three equivalents of base should be present for each mole of cyanuric acid. If less than stoichiometric proportions are used the yield of trialkyl isocyanurate is lowered correspondingly.

The alkylating agent, shown as RX in the equation, includes a variety of reactive reagents. The relative ease of alkylation depends on both the nature of X and the structure of R. Most commonly X is halogen, particularly chlorine, bromine or iodine, and sulfate or alkali sulfate. R may be alkyl, of which tertiary alkyl groups and methyl are most reactive, and alkenyl, wherein any group with an alpha-unsaturated structure may be used, including alkyl, methallyl, isobutenyl and higher alkenyl groups. The agent RX may be activated by substitution with a wide variety of groups, and R may be aralkyl and aralkenyl, such as benzyl, phenylethyl and phenylallyl. The aliphatic R groups, and aryl substituents thereon, may be substituted with any functional groups which are stable under the reaction conditions, such as nitro, carboxy, carbalkoxy, tertiary amino, keto and the like. There is also a variety of other reactive alkylating agents, most of which contain active halogen, such as aliphatic chlorosulfites, alkoxyalkyl chlorides, substituted chloromethyl ethers, and other reactive compounds such as alkyl para-toluenesulfonates and the like. It is seen that many different trialkyl cyanurates may be prepared by the process of this invention.

As the acceptor for the acid formed in the alkylation, both organic and inorganic bases may be used. Aliphatic tertiary amines, and pyridine, are preferred. Inorganic basic salts, such as the alkali metal and alkaline earth carbonates and borates, may also be used. Other usable acid acceptors include quaternary ammonium hydroxides such as trimethylbenzyl ammonium hydroxide, N,N-disubstituted anilines, and anionic exchange resins. It is preferred to use an amine as the acid acceptor due to the relative insolubility of inorganic salts in the reaction mixture. The amine should have a boiling point high enough so that it does not distill out of the solution during the reaction. Thus, when the reaction is carried out at atmospheric pressure amines boiling above about 80° C. are preferred, whereas under superatmospheric pressure, amines of lower boiling point may be used.

The medium in which the reaction is carried out should be inert to the reactants, should be a solubilizing agent for the isocyanurate formed, and should permit the reaction mass to rise to a temperature high enough to insure completion of the reaction. In general, the solvent should have a boiling point above about 100° C. at atmospheric pressure, and preferably higher for more rapid reaction, the preferred temperature range being about 150° C.–200° C. The upper temperature limit is controlled by the stability of the reactants and other practical considerations.

Useful solvents include the halogenated aromatics, such as ortho-dichlorobenzene, bromobenzene, the trichlorobenzenes, the chlorinated naphthalenes and the chlorinated biphenyls, as well as other aromatics such as toluene, the xylenes, anisole and nitrobenzene, excess alkylating agent, and a wide variety of other high boiling solvents, including esters such as amyl acetate and dibutyl phthalate, ethers such as dioxane and diphenyl ether, and others such as dimethyl formamide.

The cyanuric acid is insoluble in most solvents, and the reaction is heterogeneous at the start. The products dissolve as formed, and the reaction tends to go to high temperature and homogeneity as it proceeds. The solvent used will depend on the desired reaction temperature, which in turn varies with the reactivity of the alkylating agent used, and other common variables such as whether the reaction is conducted under superatmospheric pressure, and the desired reaction rate.

In the preferred procedure for the process of this invention, the alkylating agent, the cyanuric acid, the base and the solvent are combined, to form a heterogeneous mixture as noted above. The temperature at combination may vary between room temperature and the desired reaction temperature. The reaction temperature is over 100° C. and in most cases over 150° C. It is most convenient to conduct the reaction at the reflux temperature of the mixture. The temperature rises as the reaction progresses and the alkylating agent is consumed. The final temperature is generally above 150° C., and usually in the range of 160–180° C., although temperatures outside of this range may be used in the preparation of specific compounds.

When the reaction is complete, usually in five to ten hours, the acid acceptor generally settles out of the cooled reaction mixture, in the form of either an amine salt or an inorganic salt. These salts may be separated by filtration or by extraction with water. If desired the free base may be recovered and reused. The trialkyl isocyanurate is readily separated from the organic residue by standard separation procedures, such as crystallization, distillation or extraction.

The process of this invention constitutes a substantial improvement in the preparation of trialkyl isocyanurates, thus making available a large number of useful compounds. These compounds are of particular interest in pharmaceutical and pesticidal applications and, if substituted with reactive groups, as chemical intermediates. Unsaturated compounds such as triallyl and trimethallyl isocyanurates may be polymerized by standard procedures to form both fusible polymers containing residual unsaturation and capable of further reaction, and infusible cross-linked polymers. The trialkenyl isocyanurates may be copolymerized with vinyl monomers and with unsaturated polyesters, and used in laminates, molding and casting compounds and glass-reinforced plastics.

The specific practice of this invention is illustrated in the following examples:

*Example 1*

Tribenzyl isocyanurate was prepared by the reaction and essentially stoichiometric proportions of cyanuric acid, benzyl chloride and triethylamine, as follows: A flask equipped with a stirrer, condenser, and heating mantle was charged with 32.2 g. cyanuric acid (98% pure, 0.24 mole), 101 g. benzyl chloride (94% pure, 0.74 mole), 81 g. triethylamine (0.80 mole) and 200 ml. o-dichlorobenzene. This mixture was refluxed for three hours, during which time the temperature rose from about 120° to 180° at the end of the reaction. The mixture was then filtered hot. About 104 g. of crude triethylamine hydrochloride was obtained. The filtrate was cooled, to precipitate crystals of tribenzyl isocyanurate, which after washing with ether weighed 75 g. and melted at 161–163° C. The mother liquor was diluted with about 200 ml. of pentane and a second crop of crystals was isolated, weighing 14 g. and melting at 161–163° C. The product was identified by melting point and mixed melting point with an authentic sample of tribenzyl isocyanurate. An additional 3 g. of product was obtained on washing the crude amine salt with 200 ml. of acetone, and distilling off the acetone. The total weight of product was 92 g., representing a 92% yield.

*Example 2*

In the following experiment tribenzyl isocyanurate was prepared by the reaction of components in the proportion of 1 mole cyanuric acid, 3.1 moles benzyl chloride and 1 mole triethylamine (one third the stoichiometric amount). It is seen that the product is the desired trialkyl isocyanurate, and that the yield is controlled by the amount of amine present: A mixture of 98.5 g. cyanuric acid (98.4% pure, 0.75 mole), 294.3 g. benzyl chloride (2.33 mole), 75.8 g. triethylamine (0.75 mole) and 600 ml. xylene was refluxed for 5 hours at 148° C. The mixture was filtered hot, and the cooled cake was washed with ether. The filtrate and washings were combined, and on cooling a total of 78.1 g. of tribenzyl isocyanurate precipitated. The original filter cake was extracted three times with warm acetone, and from the extracts was obtained an additional 15.8 g. of tribenzyl isocyanurate, for a total of 93.9 g. From the residual filter cake was recovered 56.1 g. of unreacted cyanuric acid. The yield of tribenzyl isocyanurate was 31.3% of theoretical based on the cyanuric acid charged, and 94% of theoretical based on the triethylamine charged.

*Example 3*

Trimethallyl isocyanurate was prepared as follows: A flask equipped with a stirrer, condenser, heating mantle, dropping funnel and thermometer was charged with a mixture of 32.2 g. cyanuric acid (98% pure, 0.24 mole), 81 g. triethyl amine (0.80 mole) and 200 ml. of o-dichlorobenzene. This mixture was warmed to 120° C., and 72 g. methallyl chloride (96% pure, 0.77 mole) was added over a four hour interval, maintaining the temperature of the mixture between 110–120° C. During the next three hours the temperature of the reaction mass was raised to 160° C., and kept at 160–165° C. for an additional four hours. The reaction mixture was filtered hot, to separate crude triethylamine hydrochloride, which was washed with 200 ml. of ether. The filtrate and the ether washing were combined, washed with two 50 ml. portions of distilled water, dried over anhydrous magnesium sulfate, and distilled under reduced pressure. After distillation of the ether and o-dichlorobenzene, the residue was crystallized from methanol, to produce 64 g. of trimethallyl isocyanurate, M.P. 85–86° C., in 89% yield.

*Example 4*

Triallyl isocyanurate was prepared as follows: To a flask fitted with a stirrer, condenser, thermometer, heating mantle and dropping funnel was charged a mixture of 322 g. cyanuric acid (98% pure, 2.44 moles), 760 g. triethylamine (7.5 moles) and 2 liters o-dichlorobenzene. This mixture was warmed to 120° C., and 600 g. allyl chloride (98% pure, 7.7 moles) was added dropwise over a three hour interval, maintaining the temperature at 120–130° C. The reaction temperature was increased to 160° over three hours, and after stirring at 160–170° C. for an additional three hour period, the reaction mass was filtered hot. The collected crude triethylamine hydrochloride was washed with about one liter of trichloroethylene. The combined filtrate and washing were washed with two 200 ml. portions of water, dried, and distilled under reduced pressure. After removal of the solvents, triallyl isocyanurate was distilled at 140–155° C. at 0.8 mm. Hg. The yield of triallyl isocyanurate was 495 g., 82% of the theoretical amount.

*Example 5*

In the following example cyanuric acid was reacted with benzyl chloride in diethylbenzene, using anhydrous sodium carbonate as the acid acceptor. It is seen that yields are low, due to insolubility of sodium carbonate in the reaction medium. A mixture of 98.5 g. cyanuric acid (98.4% pure, 0.75 mole), 313.5 g. benzyl chloride (2.48 moles) and 262.5 g. anhydrous sodium carbonate (2.48 moles) in 525 ml. diethylbenzene was refluxed for 17 hours at 175° C. The mixture was filtered hot and the cooled cake was washed with ether. From the combined filtrates was obtained a total of 62.9 g. of tribenzyl isocyanurate, separating in three crops on concentration of the filtrates. The filter cake was washed with 50% hydrochloric acid, then with 10% hydrochloric acid, then washed free of acid with water, and dried, to leave 58.5 g.

of cyanuric acid. The yield of tribenzyl isocyanurate was 21% of theoretical, or 52% based on recovered cyanuric acid.

From the foregoing description and illustrative examples, it is apparent that the novel process of this invention is susceptible to numerous modifications and variations within the scope of the disclosure, and it is intended to include such modifications and variations within the scope of the following claims.

We claim:
1. The method of producing isocyanurate triesters which comprises reacting cyanuric acid with three equivalents of a compound selected from the group consisting of allylic halides and benzyl halide in non-aqueous medium in the presence of three equivalents of a tertiary amine, at a temperature in the range of 100° to 200° C. and in the presence of an inert solvent for the isocyanurate triester formed, and separating said triester from the reaction product.

2. The method of producing triallyl isocyanurate which comprises reacting cyanuric acid with three equivalents of allyl chloride in non-aqueous medium in the presence of three equivalents of a tertiary amine selected from the group consisting of aliphatic tertiary amines and pyridine, at a temperature in the range of 100° to 200° C. and in the presence of an inert solvent for the triallyl isocyanurate formed, said solvent having a boiling point in the range of about 150° to 200° C., and separating said triallyl isocyanurate from the reaction product.

3. The method of claim 2, wherein the tertiary amine is triethylamine.

References Cited in the file of this patent
UNITED STATES PATENTS

| | | |
|---|---|---|
| 2,296,823 | Pollack et al. | Sept. 22, 1942 |
| 2,510,564 | Dudley | June 6, 1950 |
| 2,741,607 | Bradley et al. | Apr. 10, 1956 |
| 2,894,950 | Lloyd et al. | July 14, 1959 |

OTHER REFERENCES

Ponomarew: Ber. d. deutsch. chem. Ges., volume 18, pages 3268 to 3273 (1885).

Fischer et al.: Ber. d. deutsch. chem. Ges., volume 30, page 2616 (1887).

Hantzsch et al.: Ber. d. deutsch. chem. Ges., volume 38, page 1009 (1905).

Hantzsch: Ber. d. deutsch. chem. Ges., volume 39, page 150 (1906).

Dudley et al.: Journal of the American Chemical Society, volume 73, pages 2986 to 2990 (1951).

Smolin et al.: "s-Triazines and Derivatives," page 412, Interscience Publishers, Inc., February 1959.

UNITED STATES PATENT OFFICE
CERTIFICATE OF CORRECTION

Patents No. 3,075,979            January 29, 1963

James J. Tazuma et al.

It is hereby certified that error appears in the above numbered patent requiring correction and that the said Letters Patent should read as corrected below.

Column 2, line 16, for "alkyl" read -- allyl --.

Signed and sealed this 3rd day of September 1963.

(SEAL)
Attest:

ERNEST W. SWIDER
Attesting Officer

DAVID L. LADD
Commissioner of Patents